Feb. 9, 1960
M. F. BALLARD
2,924,330
CAKE PLATE
Filed Nov. 5, 1952
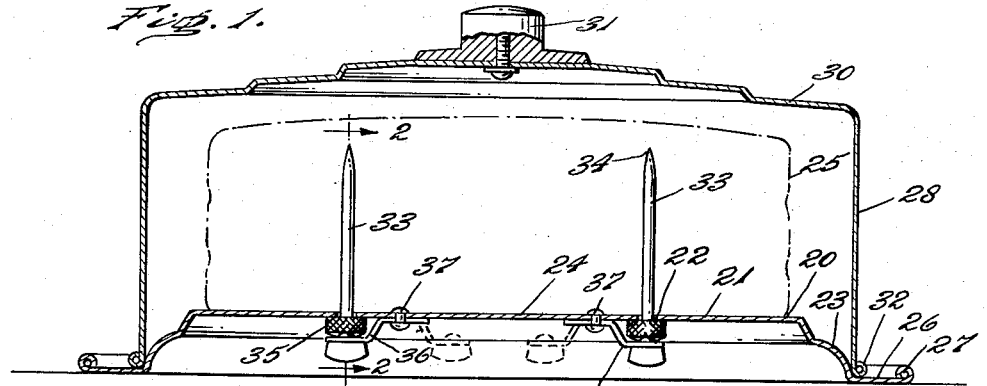
Inventor
Mary Folwell Ballard
by
Attorneys.

United States Patent Office 2,924,330
Patented Feb. 9, 1960

2,924,330

CAKE PLATE

Mary Folwell Ballard, West Chester, Pa.

Application November 5, 1952, Serial No. 318,861

1 Claim. (Cl. 206—46)

The present invention relates to devices for transporting cake and particularly to cake plates adapted for use at picnics, church suppers, and other festivities to which a cake must be transported from the point at which it has been baked, preferably without wrapping.

When reference is made herein to a cake, it is intended to designate not only what is known as a cake in the limited sense, but also any similar baked flour food product such as sweet breads, coffee cakes, cinnamon buns, cobblers, tarts, jelly rolls, and the like, which are sometimes designated as sweet goods in the baking industry.

A purpose of the invention is to permit transport of a cake without wrapping and permissibly while the icing is still sticky.

A further purpose is to improve the appearance of cakes after transport by avoiding the necessity of placing them in contact with the sides of a box or a wrapping.

A further purpose is to secure the layers of a cake against lateral slippage during the process of icing and during the period that the cake is stored prior to serving.

A further purpose is to insert removable interlocks between a cake plate and a cake which will effectively hold the cake in a predetermined position on the plate, and nevertheless will not interfere with cutting and eating.

A further purpose is to removably interconnect interlocking pins which extend through interlock openings in the bottom of a cake plate to the plate, permissibly by latches which engage heads on the pins, threading of the pins to the bottom of the plate, frictionally engaging a tapered portion of the pins to the bottom of the plate, or holding the pins by a closure.

A further purpose is to provide space for the pins when not in use in a receptacle at the back of the cake plate.

Further purposes appear in the specification and in the claim.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a central vertical section through a cake plate of the invention, illustrating the preferred embodiment.

Figure 2 is an enlarged section on the line 2—2 of Figure 1.

Figure 3 is a detail perspective of one of the latches shown in Figures 1 and 2.

Figure 4 illustrates in elevation pins of different sizes which will desirably be employed in the invention.

Figures 5 and 6 are sections corresponding to Figure 2 showing variations in the interconnecting means.

Figure 7 is a section similar to Figure 1, showing the cover in phantom, and illustrating a variation in the plate and the interconnecting means.

Describing in illustration but not in limitation and referring to the drawings:

It has been difficult in prior art practice to transport a cake, particularly an iced cake, to a picnic, church supper of the like without damage to the cake and particularly to the icing. Even with the facilities of a bakery truck, it has sometimes been difficult to transport cake, especially the higher quality made-to-order products such as birthday cakes and wedding cakes. This has resulted in some cases in serious damage, especially to the appearance of the cake. In other cases it has led to repair of the icing or initial icing at the destination.

In some instances the necessity of placing the cake in a box or of wrapping the cake has been accepted, with corresponding damage to the product.

By the present invention it is possible to transport an iced cake even over country roads without visible damage. This can be accomplished not only with denser products such as pound cake, but even with very light and fluffy cakes of the character ordinarily made only in the home. The invention also lends itself to use by professional bakers, especially in made-to-order cake production and in the production of special cakes at times of festivity, including Christmas, Easter, and in wedding and birthday cakes.

In accordance with the invention, the cake is supported on a plate, preferably of the character which does not have any upwardly extending flange at the sides which would interfere with cutting. Interlocks preferably in the form of pins extend through openings in the bottom of the plate, and are preferably limited in length so that they do not protrude beyond the top. The interlocks are securely held in place so that they will remain during transport, but are readily withdrawn at the bottom of the plate prior to the time when the cake is to be cut. Since the integrity of the icing is not destroyed by withdrawal of the interlocks, no one merely looking at the top of the cake is aware that the interlocks were present.

In one embodiment of the invention, provision is made for carrying a variety of pins in a receptacle in the cake plate itself, so that the device is self contained.

Considering first the form of Figures 1 to 4 inclusive, a cake plate 20 of the character commonly used for display and cutting of cakes has a bottom 21 provided with interlock openings 22 distributed over the bottom and at the outside has a suitably annular peripheral flange 23 extending away from the surface 24 on which the cake 25 rests, and desirably terminating in an outside rim 26 having a bead 27.

The flange 23 desirably cooperates with the side wall 28 of a cover 30 having a handle 31 so that the cover when put in place as shown in Figure 1 is frictionally held by engagement between the flange 23 and a bead 32 at the bottom of the side wall of the cover.

At at least some of the interlock openings 22, pins 33 extend from the bottom and protrude in interlocking relation into the cake desirably to a distance insufficient to expose the pins at the top of the cake. Each of the pins suitably has a pointed end 34 which makes it easy to insert the pin in the cake and has a suitably knurled head 35 too large to pass through the interlock opening 22 and accessible for grasping the pin on the bottom of the plate. In order to protect against hurt by striking against the pins, the pins may be made of frangible material, such as plastic, hard candy, pretzel material, or firm rubber, although they can also be made of metal.

Depending on the number of layers in the cake or other factors which determine the thickness of the cake, I will preferably employ long pins 33 or shorter pins 33′ or still shorter pins $33^2$ as indicated in Figure 4. Each plate will desirably be provided with sets of pins of the various sizes.

It is important that the pins in their interlock position be interconnected with the plate so that they will not drop out, for example under the vibration of a vehicle. In the form of Figures 1 to 4, latches 36 are provided on the bottom of the plate, pivoting suitably on rivets 37 passing through the plate bottom. Each of the latches has suitable projections 37' which in the latching position desirably engages on the two sides of the head of the pin, and each of the latches has wing extensions 38 which serve as handles for swinging the latches. The latches are desirably of spring, or resilient metal such as spring temper stainless steel of beryllium copper, so that they will snap into place over the heads of the pins.

In operation of the form of Figures 1 to 4, the cake after baking will suitably be assembled on the plate preparatory to icing. The interlayer icing will desirably be applied if the cake is a multilayer cake, and then before icing the exterior the pins will be inserted from below and the latches engaged to hold the pins. The external icing of the cake will then be accomplished, after which the cover 30 will be applied.

The cake is now ready for transport, and after arrival, suitably in connection with the final serving of the cake, the latches will be swung to one side and the pins removed from the bottom. If the pins are of edible material, they can of course be served in the cake. As soon as this has been done the cake can be served in the usual manner. If a portion of the cake is not consumed, the pins can be reinserted at desired locations and the latches put back in place over the heads before taking the cake home.

The invention is applicable not only for use on cakes which are to be transported, but also as a means of assuring relative interlayer stability in multilayer cakes. It sometimes happens that the layers rise unequally on opposite sides during the baking process, thus creating a tendency for slippage toward the low side, especially when the interlayer icing is wet. When the invention is to be applied for interlayer stability, it is best to insert the pins through the first layer on the plate, and then apply the interlayer icing on the first layer, and next apply the succeeding layer over the pins, using the pins to assure maintenance of centering of the upper layer. This procedure can be followed in applying each succeeding layer to the cake. The procedure outlined makes it possible to use very fluid icings, and transport the cake around the house or to greater distances without waiting for the icing to harden.

If desired, other forms of interconnections between the pins and the plate may be used. In Figure 5 I illustrate a slightly enlarged portion 40 adjacent to a modified head 35' on the pin. The portion 40 has male threads, and female threads 41 engaging with the male threads are provided on the bottom 21 of the plate. If desired the bottom may be thickened as at 42 to provide a sufficient length for the female threads 41.

In some cases frictional engagement will be employed, and in Figure 6 I illustrate a tapered shank 43 on each pin adjoining the head 35, the tapering being larger near the head and smaller toward the point of the pin. A tapered interconnecting portion 44 on the plate at each interlock opening engages the tapered portion 43 and makes a jam fit when the pin is forced home.

In some cases as shown in Figure 7 it is preferable to employ an interconnecting device which holds all pins in place. The flange 23' which engages the cover is in this case provided on the rear face with an annular seating ring 45 having bayonet projections 46 at intervals, and a closure 47 having cooperating bayonet projections 48 is inserted in the seating ring 45 with the projections 46 and 48 annularly out of registry, and then turned to engage the projections 48 behind the projections 46 and hold the closure in place. Finger holes 50 make it easy to grip the closure to turn it. When locked in position as shown in Figure 7, the closure engages the heads 35² of the pins 33 and holds the pins in place in comparatively elongated interlock opening 22' desirably formed in bosses 51 on the back of the bottom of the plate.

In the space between the plate and the closure 47 a receptacle 52 is formed which receives pins which are not in use and desirably is capable of containing the entire group of pins.

The operation of the forms of Figures 5, 6 and 7 is similar to that of Figures 1 to 4, the only difference being that the procedure is modified to accommodate the particular interconnection which is used between the plate and the pin.

Having thus described my invention, what I claim as new and desire to secure by Letters Patent is:

In a device for transporting cake, a plate having a bottom adapted to support a cake and provided with interlock openings distributed over the bottom, pins in one position extending through the interlock openings and having heads on the ends of the pins beneath the plate, and swingable latches pivoted on the bottom of the plate and in one position engaging the heads and holding the pins in place and in another position releasing the heads.

References Cited in the file of this patent

UNITED STATES PATENTS

| | | |
|---|---|---|
| 943,767 | Bullard | Dec. 21, 1909 |
| 1,516,582 | Spalding | Nov. 25, 1924 |
| 1,939,342 | Edwards | Dec. 12, 1933 |
| 2,020,534 | Brown | Nov. 12, 1935 |
| 2,111,456 | Markle | Mar. 15, 1938 |

FOREIGN PATENTS

| | | |
|---|---|---|
| 299,966 | Great Britain | Nov. 8, 1928 |